June 19, 1928. 1,674,519
S. S. PATTERSON
STONE SAWING MACHINE
Filed Sept. 21, 1927 4 Sheets-Sheet 3
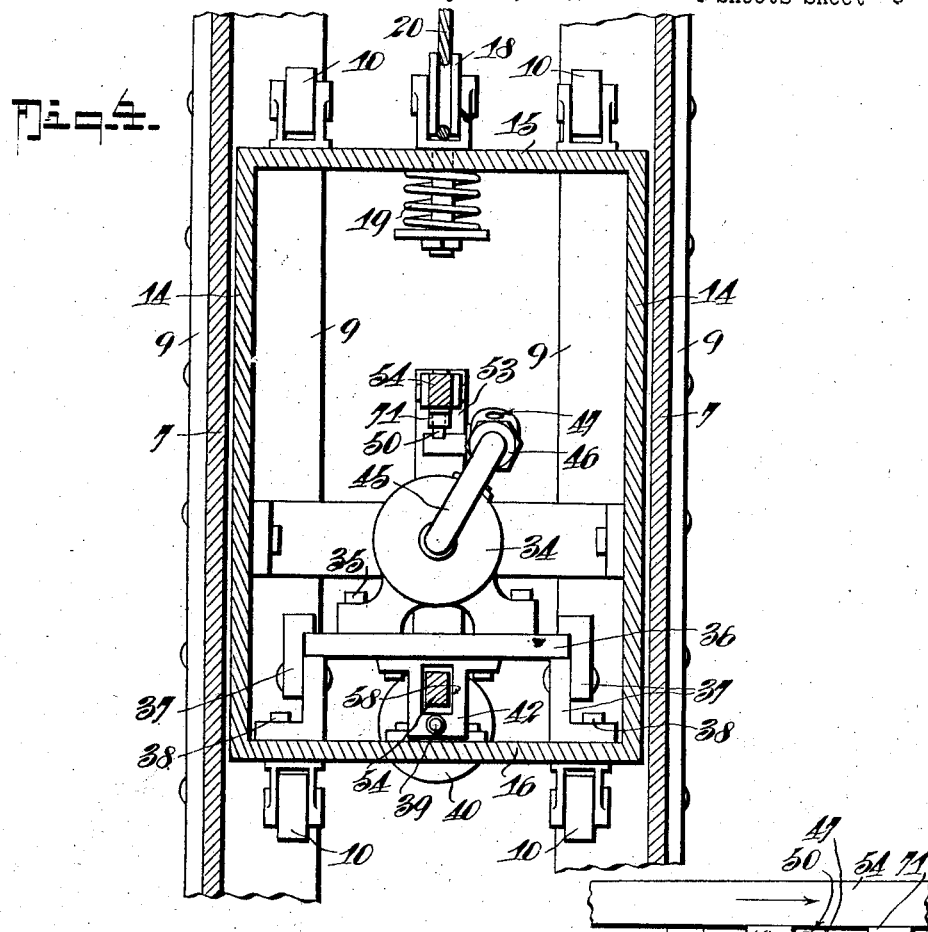
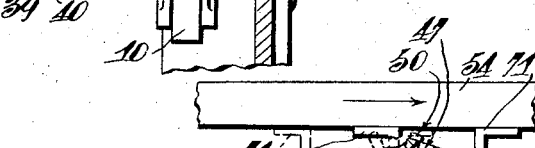
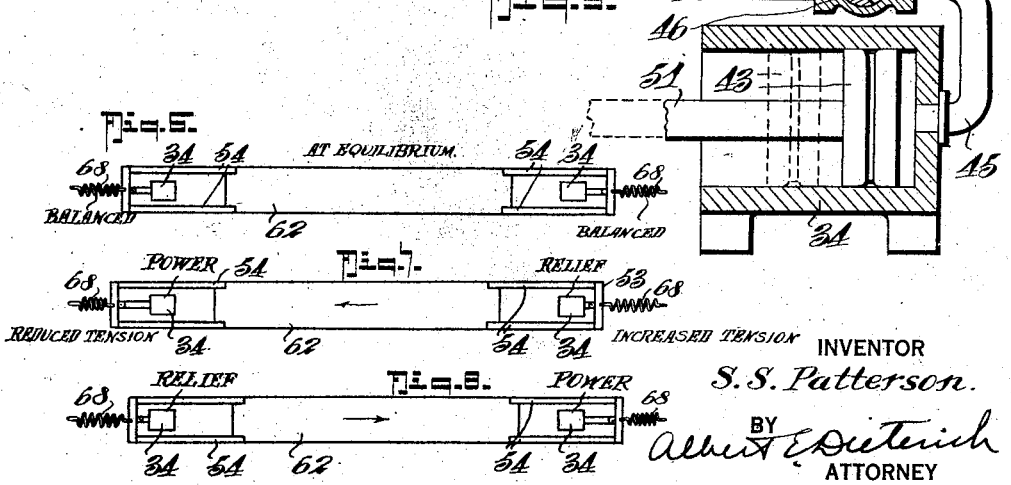
INVENTOR
S. S. Patterson.
BY
ATTORNEY

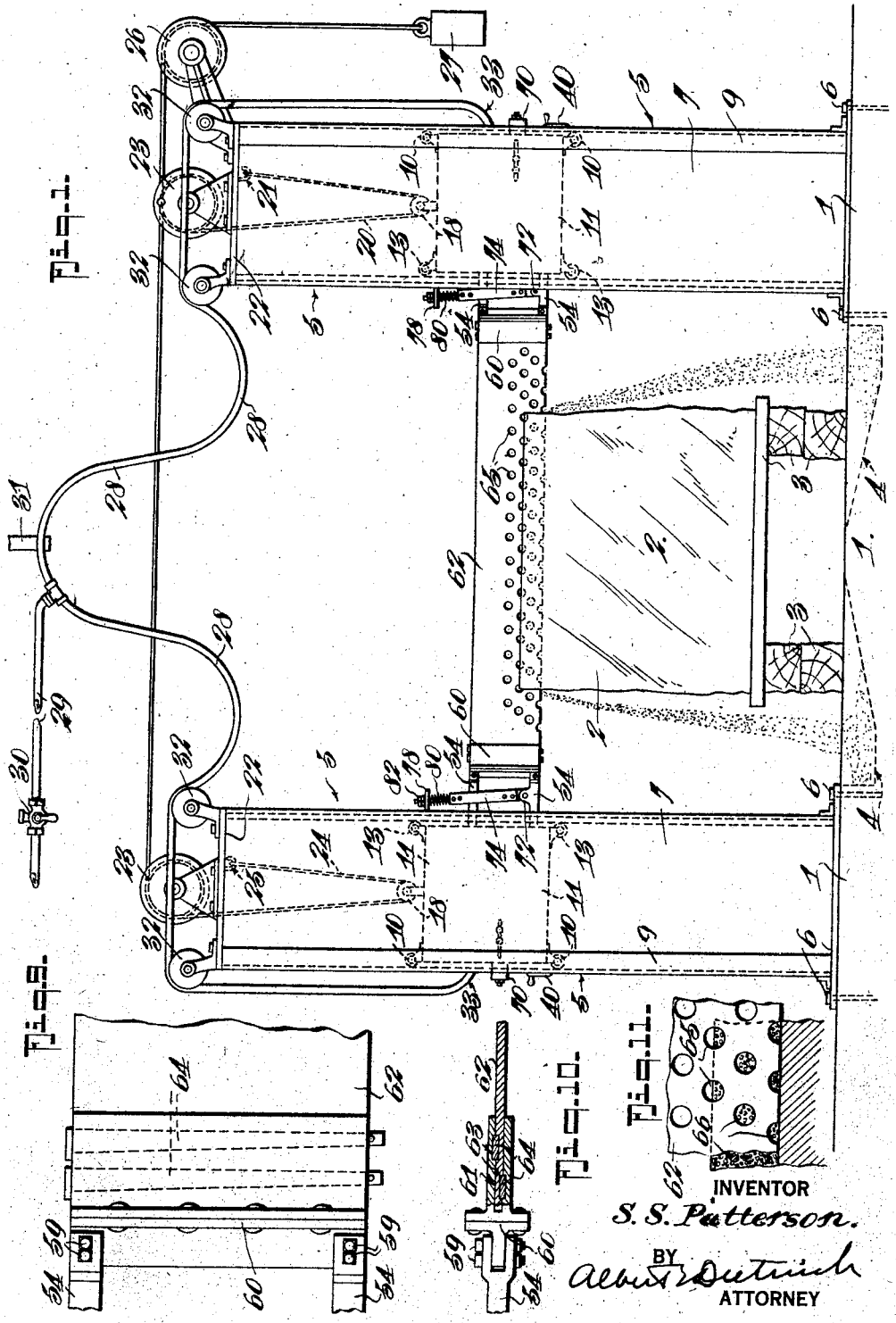

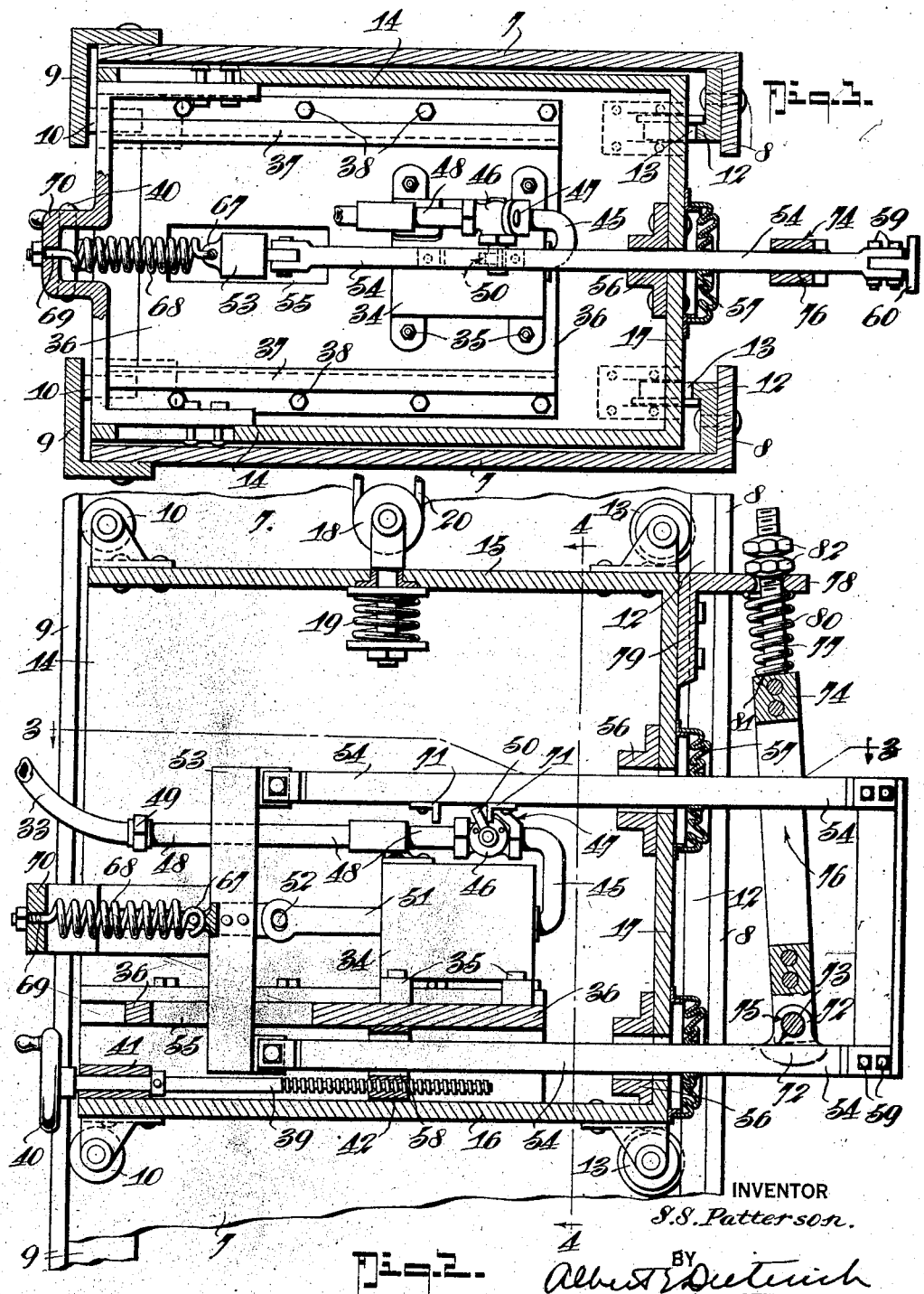

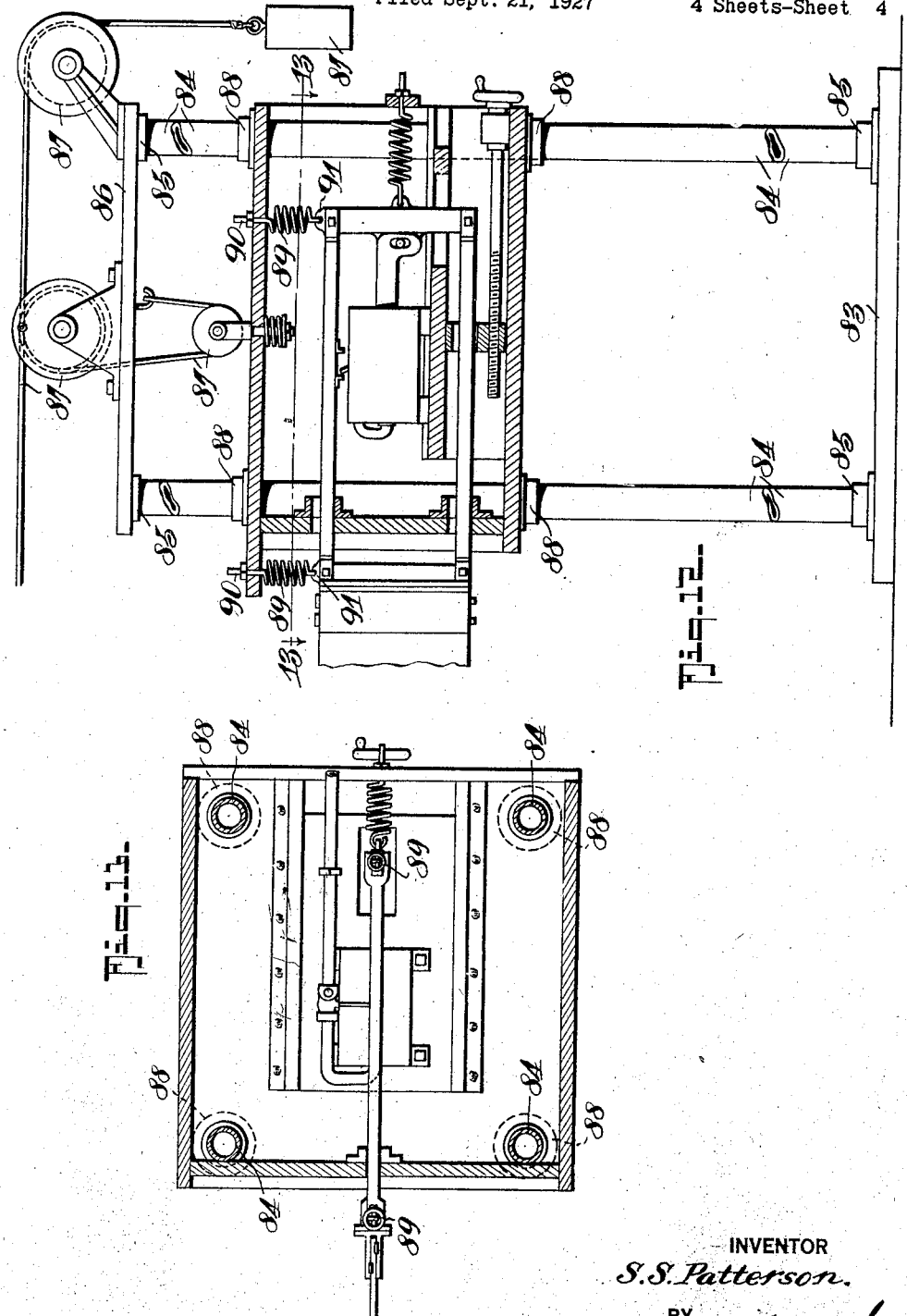

Patented June 19, 1928.

1,674,519

UNITED STATES PATENT OFFICE.

SANFORD SMITH PATTERSON, OF ATLANTA, GEORGIA, ASSIGNOR TO MAY PATTERSON GOODRUM, OF ATLANTA, GEORGIA.

STONE-SAWING MACHINE.

Application filed September 21, 1927. Serial No. 221,008.

The invention generally relates to stone sawing machines and has for its object to provide certain new and useful improvements in machines of that type, by the employment of which the stone sawing may be accomplished in a highly efficient manner, with a minimum of wear on the working parts and in which all tendency toward disabling of the parts and possibility of breakage is practically eliminated.

The invention further has for its object to provide a sawing machine of the character stated in which the parts are simple in arrangement and construction and economical to manufacture and operate, and are so formed and cooperatively arranged that the sawing function is accomplished without shock or jerky motion and in a natural and smooth manner, assuring high-class work and eliminating all possibilities of the saw becoming bent, broken, buckled or twisted while in operation.

The invention further resides in the provision of means to impart a rapid, balanced and cushioned reciprocation to the saw, occasioned by alternate drags always at the leading end thereof, and means to yieldably hold the saw to the work while operating to accomplish the sawing function without any forcing action.

The invention further resides in the provision of means acting simultaneously with each alternate saw drag to resist said drag at the opposite end of the saw and serve to assure holding the saw taut in a manner providing for more efficient cutting and overcoming all tendency to buckle.

To the attainment of the aforesaid objects, and others that will be obvious, the invention still further resides in the provision of the novel details of construction, combination and arrangement of parts, all of which will be first fully described in the following detailed description, then be particularly pointed out in the appended claims, reference being had to the accompanying drawings, in which:

Figure 1 is a somewhat diagrammatic side elevation illustrating a stone sawing machine of the stationary or rigid type embodying the invention and mountable for use.

Figure 2 is a vertical longitudinal section taken through one of the saw end carrying cars.

Figure 3 is a horizontal section taken on the line 3—3 on Figure 2.

Figure 4 is a vertical cross section taken on the line 4—4 on Figure 2.

Figure 5 is an enlarged somewhat diagrammatic vertical longitudinal section of one of the saw actuating pneumatic heads.

Figures 6, 7 and 8 are diagrammatic side elevations illustrating the manner of reciprocating the saw.

Figures 9 and 10 are fragmentary side and plan views illustrating the means for mounting the saw ends, part of the latter view being shown in horizontal section.

Figure 11 is a fragmentary side view illustrating a portion of the saw in the saw kerf.

Figure 12 is a side elevation of a modified arrangement of the invention embodied in a portable structure for small work.

Figure 13 is a horizontal section taken on the line 13—13 on Figure 12.

In the drawings, 1 represents a suitable supporting base of concrete or the like on which the stone to be cut, indicated at 2, is mounted upon a suitable support 3 (on a car, truck or wooden bolsters, as indicated in Figure 3 of the drawings). In the base floor abradant collecting troughs 4 are provided in suitable positions to receive and collect the abradants used to facilitate the cutting action so that they may be readily taken up and reused.

Outwardly of each end of the stone mounting space a saw mounting shaft, generally indicated at 5, is provided and secured as at 6, to the base 1 to stand uprightly therefrom in vertical parallel spaced relation. Each of the shafts includes closed side walls 7, inside bent angles 8 and outside affixed angles 9 providing a vertical guideway open at its ends and closed at its sides, see Figure 3.

The angles 9 serve as tracks for the antifriction rollers 10 secured at the outside corners of the cars 11 vertically slidable in the vertical guideways provided in the shafts 5. The angles 8 support guide track rails 12 secured to the insides thereof and which serve as tracks for the main flanged rollers 13 mounted on the inside corners of the cars 11, see Figures 1, 2 and 3.

Each car 11 includes closed side walls 14, top and bottom plates 15 and 16 respectively, and a closed front or inside wall 17, the backs or outer ends of the cars remaining open, as indicated in Figure 2.

A pulley 18 is provide at the top of each car 11 and has its shank passed through the top plate of the car and attached to a cushion spring 19 serving as a yieldable support for the car and serving to cushion-support its weight.

A cable 20 is passed around one of the pulleys 18 and has one end fixed to a hook 21 depending from the respective shaft top cover plate 22 and its other end passed around and secured to the large pulley 23 mounted on top of said plate, one of said pulleys being mounted on each shaft top plate 22. Another cable 24 is passed around the pulley 18 of the other car and has one of its ends attached to the hook 25 depending from the respective shaft top plate 22 and its other end passed around and over the pulley 23 mounted on the said plate, around and over the pulley 23 on the first mentioned top plate 22 and over another large pulley 26 mounted on the first mentioned shaft 5 and has its free end attached to a counterbalance weight 27 (see Figure 1).

The weight 27 is heavy enough to counterbalance the weight of the cars 11 and the arrangement of the cables and pulleys is such that when the weight is raised or lowered the cars will be correspondingly lowered or raised and will remain at their adjusted positions. It should be understood that it is not my intention to force-feed the saw to the work. I rely solely on the rapid reciprocatory motion of the saw and no more pressure is applied to the said saw than is necessary to present it to the work or merely keep it in engagement with the work.

A pneumatic hose or other conducting line 28 is provided and is supplied with compressed air or other suitable power fluid through the pipe line 29 from any suitable source of supply. The line 29 is controlled by a valve 30 which may be adjusted to permit passage of air into the hose 28 to cause actuation of the saw operating devices or to cut off the flow of fluid to the said line and permit the fluid contained in the line to bleed out through the valve so that the operating devices will cease to function.

It will be found convenient to support the loop of the hose 28 upon any suitable supporting medium 31 and to carry the ends thereof over suitable supporting pulleys 32 mounted on the tops of the guide shafts 5, the extreme ends of the hose being directed into the open rear or outer portions of the cars 11, as indicated at 33 in Figures 1 and 2.

Each car 11 is equipped with a pneumatic head 34 secured as at 35 upon a carrier plate 36 which is longitudinally slidable in grooved standards 37 secured at 38 upon the car bottom plates 16, see Figures 3 and 4.

The plates 36 are longitudinally slidable in the cars so that the positions of the heads 34 may be varied for a purpose later to be described. To accomplish this purpose I provide each car with an adjustment screw 39, equipped at its outer end with a hand wheel 40 and having its shank freely rotatably mounted in a bearing 41 carried by the car bottom plate 16. The threaded portion of the screw works in a threaded bore in a lug 42 secured to depend from the plate 36. Thus when the hand wheel 40 is rotated the plate 36 to which the lug 42 is attached will be advanced or retracted in its grooved mountings.

In each pneumatic head or cylinder 34 a piston 43 is reciprocable, the said cylinders being open at one end and closed at their other or inner ends, as at 44. Into the closed end 44 of each pneumatic head an air injecting and relieving tube 45 is projected, the other end of the said tube being connected with a three-way valve 46 including an exhaust port 47 and a throat to connect with the air pipe 48, which is in turn connected by the union 49 to the respective air hose end 33. Each valve stem of the valves 46 is provided with a turning crank 50.

A piston rod 51 is carried by each piston and projects axially through the open end of the pneumatic head to be pin and slot connected as at 52 with a vertical cross head 53 and cause the said cross head to move with the piston. Drag arms 54 are provided and are connected to the ends of the cross head 53 to be caused to reciprocate with the cross head, a suitable slotway 55 being provided in each plate 36 to permit the necessary reciprocation of the cross head.

The inner ends of the arms 54 are passed through bearing-equipped openings 56 in the inner walls 17 of the cars, which said openings are protected by flexible boots 57 of leather, rubber, or other suitable material, from abrasive dust. Suitable passageways 58 also are provided in the lugs 42 to permit free passage of the lower arms 54.

The extreme inner ends of the arms 54 are secured as at 59 to T-heads which are in turn secured to other T-heads 60 having saw end receiving grooves 61 to receive the ends of the thin blade saw 62. Key grooves 63 are provided in the T's 60 and in the saw ends and keys 64 are mountable in the said keyways to secure the saw ends to position, see Figures 1, 9 and 10.

The saw blade may be provided with rows of closely positioned cross apertures 65 to aid in holding the abradants 66 (shot, crushed steel or the like) used to facilitate the sawing action. When one series of apertures wear out the next series will come into function, see Figures 1 and 11.

The cross heads 53 are also each connected as at 67 to a retractile spring 68, the other end of which is adjustably connected as at 69 to a cross brace 70 which may be adjustably secured to the car side walls, see Figures 1, 2 and 3. The purpose for the springs will later be apparent.

Each upper drag arm 54 is provided with a pair of spaced valve actuating fingers 71 adapted, as the said arm is reciprocated, to alternately engage the valve crank arm 50 and properly change the position of the valve to cause air injection behind the piston in the closed end of the cylinder on the power or drag stroke of the respective piston and saw end and to relieve pressure behind the piston through the pipe 45 and exhaust port 47 when the pneumatic head in the other car is functioning to drag the saw in the reverse direction, see Figure 2.

Each lower drag arm 54, where it projects out of the inner car wall, is provided with upwardly projecting spaced apertured ears 72 to which the rocker end 73 of a yieldable hold-down-lever 74 is loosely pivoted at 75. The pivot serves to connect the arm and lever while permitting the end 73 of the lever which is curved on an arc, to roll on the upper edge of the said arm, see Figure 2. Each lever 74 is slotted as at 76 to straddle the respective upper arm 54 to permit independent movement of the lever and arm longitudinally but not laterally. At its upper end the lever is provided with a threaded shank 77 which is passed through an aperture in a bracket 78 secured at 79 to the inner wall 17 of the respective car. A coil spring 80 is interposed between the shoulder 81 of the lever and the under side of the bracket 78 and serves to apply light pressure to the lower arm within the limitation offered by the limiting nuts 82 mounted on the shank 77 above the bracket 78.

By rockably mounting the lever 74 on the bracket 78 as the saw is reciprocated it will be elevated slightly at the end of each stroke. The amount of elevation is almost imperceptible but acts to exert the greatest pressure at the center of the stroke and serves to provide a more efficient cut and smoother and better work. Also the lever serves to reciprocably support the saw and arms 54 and by reason of the provision of the spring equipments 80 the suspension of the said saw and arms is flexible or yieldable and if the saw meets with an obstruction it is free to yield upwardly. It is to be understood, of course, that the openings and bearings through which the arms 54 pass permit sufficient freedom of action of the arms in the vertical direction, but, like the lever 74, restrain the arms against lateral or twist movement and effectively overcome all tendency of the saw to twist or whip laterally.

In Figures 6, 7 and 8 I have diagrammatically illustrated the manner of reciprocating the saw. By reference to these figures, and to Figure 5, it will be observed that the pneumatic heads operate alternately and in such manner that the power applied to the saw to reciprocate it is always a drag at the advance end of the saw blade and not a push at the following end of the blade. Thus when one pneumatic head is operating to draw the saw toward it the pneumatic head at the other side of the machine is not functioning except to relieve air in advance of its piston to permit free movement thereof. Also each power drag action at one end of the saw is accompanied by a spring resistance set up by the spring 68 at the opposite end of the saw serving to hold the saw tight and overcome all tendency toward buckling or whipping action and assure a straight smooth cut of the stone.

It should be understood that when the parts are in their normal position, at equilibrium, with the power fluid cut off, the pistons will rest centrally in the cylinders and the springs 68, which are under balanced tension, will serve to hold them to that position until the power fluid is turned on. As the air or other power fluid enters the particular pneumatic head whose piston is in position to receive it, the piston will be forced over the remainder of the stroke until the valve 46, associated with that particular cylinder, is actuated to cut off the power fluid and open relief communication through the exhaust port 47. At this same instant the valve associated with the opposite pneumatic head is actuated to close relief communication and open power communication through the valve into the cylinder behind its piston to impart a power drag to the saw at the opposite end. It should also be understood that the spring 68 at the end toward which the saw is moving at a particular time is being slackened to reduce its tension while the corresponding spring at the opposite or following end of the saw is being extended to increase its tension a corresponding amount.

Thus a positive power impulse is imparted to the advance end only of the saw on each stroke corresponded by an accompanying spring resistance at the opposite end of the saw serving to hold the saw taut. Also, in addition to providing the saw trailing end resistance and holding the parts in balanced relation each spring which has been distended serves to aid its accompanying pneumatic head on the next power stroke in direction toward the said distended spring.

In Figures 12 and 13 I have disclosed a modified form of the invention in which one shaft and car equipment is shown which is constructed in a manner permitting its use in forming a more or less light weight and portable machine that can be used for smaller work.

In this form of the invention the shaft, which may be cooperatively associated with its acompanying shaft and with the work, in any approved manner, includes a base 83 and upright corner standards 84 preferably constructed of hollow pipe sections and rigidly secured at 85 to the said base and to the cap plate 86. Car supporting and counterweighting devices 87 similar in construction and operation to those employed in the stationary machine and the detailed construction of which has hereinbefore been described, are employed and indicated at 87. The vertically slidable car employed in this form of the invention is also substantially the same as the cars hereinbefore described in detail in connection with the stationary machine and further detailed description thereof is deemed unnecessary in connection with this form other than that the said cars are provided at their corners with circular guides 88 to surround and slidably ride on the corner standards 84.

Instead of the yieldable lever equipment 73—82 of the stationary machine the portable machine cars may be provided with vertically positioned springs 89 adjustably suspended at 90 from the car top plate and connected at 91 to the knife carrying and operating devices and which serve to yieldably support the said devices in a manner similar in some measures to the support furnished by the devices of the stationary machine referred to.

By adjustably mounting the pneumatic heads 34 and the springs 68 variation in saw lengths may be accommodated and the tension of the springs may be adjusted to suit conditions of use.

I also desire it understood that the pneumatic heads shown in this disclosure comprise but one simple means to impart the desired advance end drag to the saw and that any other power heads capable of accomplishing like movements of the saw may be employed without departing from the scope of the appended claims.

From the foregoing description, taken in connection with the accompanying drawings, it is thought that the novel details of construction, the manner of use and the advantages of my invention will be readily apparent to those skilled in the art to which it relates.

What I claim is:

1. In stone sawing machines, a pair of spaced supports between which the stone-to-be-sawed is adapted to be placed, cars on the said supports, saw carrying arms mounted on each car, a saw blade connected at its ends to said arms, resilient means continuously tending to apply tension in opposite directions to said arms thereby to maintain the same taut, and power applying means associated with said arms for effecting reciprocation thereof and of the saw.

2. In stone sawing apparatus, a pair of spaced supports between which the stone-to-be-sawed is located, a saw, a car on each support, reciprocatable saw carrying arms secured to each end of the saw and mounted on the respective cars, resilient tension applying means on each car to pull said arms in opposite directions thereby maintaining the saw taut and in a balanced position, and means on at least one car for effecting reciprocation of said saw carrying arms.

3. In stone sawing apparatus, a pair of spaced supports between which the stone-to-be-sawed is located, a saw, a car on each support, reciprocatable saw carrying arms secured to each end of the saw and mounted on the respective cars, resilient tension applying means on each car to pull said arms in opposite directions thereby maintaining the saw taut and in a balanced position, means on at least one car for effecting reciprocation of said saw carrying arms, said last named means comprising a cylinder and piston device and fluid operated means for actuating the piston in one direction.

4. In stone sawing apparatus, a pair of spaced supports between which the stone-to-be-sawed is located, a saw, a car on each support, reciprocatable saw carrying arms secured to each end of the saw and mounted on the respective cars, tension applying means on each car to pull said arms in opposite directions thereby maintaining the saw taut and in a balanced position, means on at least one car for effecting reciprocation of said saw carrying arms, said tension applying means comprising a coiled spring connected to each car and to the arms at the respective end, and said springs when at equilibrium having like tension stored up therein.

5. In stone sawing apparatus, a pair of spaced supports between which the stone-to-be-sawed is located, a saw, a car on each support, reciprocatable saw carrying arms secured to each end of the saw and mounted on the respective cars, tension applying means on each car to pull said arms in opposite directions thereby maintaining the saw taut and in a balanced position, said tension applying means comprising a coiled spring connected to each car and to the arms at the respective ends, said springs when at equilibrium having like tension stored up therein, and a power device on each car, said device being adapted to alternately apply a drag on the arms and saw at the respective ends and to reduce the stored tension of the adjacent spring while correspondingly increasing the tension on the other spring.

6. In stone sawing apparatus, a pair of spaced supports between which the stone-to-be-sawed is located, a saw, a car on each support, reciprocatable saw carrying arms secured to each end of the saw and mounted on the respective cars, tension applying means on each car to pull said arms in opposite directions thereby maintaining the saw taut and in a balanced position, said tension applying means comprising a coiled spring connected to each car and to the arms at the respective ends, said springs when at equilibrium having like tension stored up therein, a power device on each car, said device being adapted to alternately apply a drag on the arms and saw at the respective ends and to reduce the stored tension of the adjacent spring while correspondingly increasing the tension on the other spring, and means to adjust the positions of the power devices and the tension applying means for the purpose described.

7. In stone sawing apparatus, a pair of spaced supports between which the stone-to-be-sawed is located, a saw, a car on each support, reciprocatable saw carrying arms secured to each end of the saw and mounted on the respective cars, tension applying means on each car to pull said arms in opposite directions thereby maintaining the saw taut and in a balanced position, said tension applying means comprising a coiled spring connected to each car and to the arms at the respective ends, said springs when at equilibrium having like tension stored up therein, a power device on each car, said device adapted to alternately apply a drag on the arms and saw at the respective ends and to reduce the stored tension of the adjacent spring while correspondingly increasing the tension on the other spring, and means controlled by movement of the carrying arms to coordinate the action of the power devices to cause one to come into function to apply its drag to the advance carrying arms just as the other power device completes its drag action on the other or former advance carrying arms.

8. In stone sawing apparatus, a pair of spaced supports between which the stone-to-be-sawed is located, a saw, a car on each support, reciprocatable saw carrying arms secured to each end of the saw and mounted on the respective cars, tension applying means on each car to pull said arms in opposite directions thereby maintaining the saw taut and in a balanced position, a power head on each car comprising a cylinder closed at one end and open to atmosphere at its other end and a piston reciprocatable in the cylinder and connected with the arms at that end, a fluid pressure line, valves in the line one associated with each cylinder and communicating with atmosphere and into the closed end of the cylinder, and means actuated by movement of the arms to operate the valves to admit fluid behind one piston at a time to drive it outwardly while simultaneously cutting off fluid communication in advance of the other piston and opening communication with the area in advance of said other piston to atmosphere.

9. In stone sawing machines, a pair of spaced supports between which the stone-to-be-sawed is adapted to be placed, cars on the said supports, saw carrying arms mounted on each car, a saw blade connected at its ends to said arms, means continuously tending to apply tension in opposite directions to said arms thereby to maintain the same taut, power applying means associated with said arms for effecting reciprocation thereof and of the saw, and yieldable means attached to each car and to the respective carrying arms to yieldably support said arms and the respective saw end on the car.

10. In stone sawing machines, a pair of spaced supports between which the stone-to-be-sawed is adapted to be placed, cars on the said supports, upper and lower saw carrying arms mounted on each car, a saw blade connected at its ends to said arms, means continuously tending to apply tension in opposite directions to said arms thereby to maintain the saw taut, power applying means associated with said arms for effecting reciprocation thereof and of the saw, yieldable means attached to each car and to the respective carrying arms to yieldably support said arms and the respective saw end on the car, each said last named means comprising a lever slotted to straddle the upper arm and connected to the lower arm, and means to yieldably and rockably mount the upper end of the lever on the car.

11. In stone sawing machines, a pair of spaced supports between which the stone-to-be-sawed is adapted to be placed, cars on the said supports, upper and lower saw carrying arms mounted on each car, a saw blade connected at its ends to said arms, means continuously tending to apply tension in opposite directions to said arms thereby to maintain the saw taut, power applying means associated with said arms for effecting reciprocation thereof and of the saw, yieldable means attached to each car and to the respective carrying arms to yieldably support said arms and the respective saw end on the car, each of said last named means comprising a lever slotted to straddle the upper arm and connected to the lower arm permitting relative longitudinal movement of the lever and upper arm but preventing lateral twist movement of the arms, and means to yieldably and rockably mount the upper end of the lever on the car.

12. In stone sawing machine, a pair of spaced supports between which the stone-to-be-sawed is adapted to be placed, cars on the said supports, upper and lower saw carrying arms mounted on each car, a saw blade connected at its ends to said arms, means continuously tending to apply tension in opposite directions to said arms thereby to maintain the saw taut, power applying means associated with said arms for effecting reciprocation thereof and of the saw, yieldable means attached to each car and to the respective carrying arms to yieldably support said arms and the respective saw on the car, each said last named means comprising a lever slotted to straddle the upper arm and connected to the lower arm, means to yieldably and rockably mount the upper end of the lever on the car, said upper end mounting for the lever being positioned centrally of the reciprocating movement of said arms, and said lower lever end connection constituting a loose pivot, and said lower lever end terminating in an arcuate portion adapted to ride on said lower arm for the purposes specified.

13. In a stone sawing machine, a saw blade, carrying means attached to each saw end, means associated with each carrying means to alternately apply end drags to the carrying means and saw, and tension springs normally having balanced stored tensions and alternately active to resist and aid alternately applied drag actions.

14. In a stone carrying machine, a saw blade, carrying means attached to each saw end, means associated with each carrying means to alternately apply end drags to the carrying means and saw, a retractile spring associated with each carrying means, said springs normally having balanced stored tensions and being adapted to alternately aid the drag action applied by its associated carrying means and resist the drag action of the other carrying means.

15. In stone sawing apparatus wherein is provided a saw blade adapted to be reciprocated, a support, a car vertically adjustably carried by the support, guides for the car on the support, carrying arms secured to the adjacent saw blade end and projecting into the car, means carried by the car to yieldably suspend the arms, a power head carried by the car and adapted to apply a drag to the arms and adjacent blade end at intervals, and means at the other end of the saw blade for maintaining the blade taut.

16. In stone sawing apparatus wherein is provided a saw blade adapted to be reciprocated, a support, a car vertically adjustably carried by the support, guides for the car on the support, carrying arms secured to the adjacent saw blade end and projecting into the car, means carried by the car to yieldably suspend the arms, a power head carried by the car and adapted to apply a drag to the arms and adjacent blade end at intervals, means at the other end of the saw blade for maintaining the blade taut, and a retractile spring attached at one end to the car and at its other end to the arms and adapted to aid the drag applying action of the power head and to balance the action of the means for maintaining the blade taut.

17. In stone sawing apparatus wherein is provided a saw blade adapted to be reciprocated, a support, a car vertically adjustably carried by the support, guides for the car on the support, carrying arms secured to the adjacent saw blade end and projecting into the car, means carried by the car to yieldably suspend the arms, a power head carried by the car and adapted to apply a drag to the arms and adjacent blade end at intervals, said car having closed side walls and an inner closed wall having openings to permit passage of the carrying arms, flexible boots secured to the car inner wall and the arms and surrounding the openings to close them against abradant dust, and means at the other end of the saw blade for maintaining the blade taut.

18. In stone sawing apparatus wherein is provided a saw blade adapted to be reciprocated, a support, a car vertically adjustably carried by the support, guides for the car on the support, carrying arms secured to the adjacent saw blade end and projecting into the car, means carried by the car to yieldably suspend the arms, a power head and a retractile spring carried by the car and adapted to apply a drag to the arms and adjacent end at intervals, said car having closed side walls and an inner closed wall having openings to permit passage of the carrying arms, flexible boots secured to the car inner wall and the arms and surrounding the openings to close them against abradant dust, means to adjust the positions of the power head and the retractile spring, and means at the other end of the saw blade for maintaing the blade taut.

19. In stone sawing apparatus wherein is provided a saw blade adapted to be reciprocated, a support, a car vertically adjustably carried by the support, guides for the car on the support, carrying arms secured to the adjacent saw blade end and projecting into the car, means carried by the car to yieldably suspend the arms, a power head carried by the car and adapted to apply a drag to the arms and adjacent blade end at intervals, means to secure the carrying arms to the blade end comprising a T-head secured to the adjacent carrying arm ends, a second T-head secured to the first mentioned T-head and having a blade end receiving slot and keyways, said adjacent blade end having keyways, keys inserted in the T-head and blade end keyways to secure the said blade end in the said slot and means at the other end of the saw blade for maintaining the saw taut.

20. In stone sawing apparatus wherein is provided a saw blade adapted to be reciprocated, a support, a car vertically adjustably carried by the support, guides for the car on the support, carrying arms secured to the adjacent saw blade end and projecting into the car, means carried by the car to yieldably suspend the arms and prevent twisting of the blade, a power head comprising a cylinder and reciprocable piston connected to the carrying arms, means controlled by movement of the carrying arms to direct fluid pressure into the cylinder behind the piston at intervals to apply a drag to the arms and adjacent blade end, and means at the other end of the saw blade for maintaining the blade taut.

SANFORD SMITH PATTERSON.